United States Patent [19]

Ferrier et al.

[11] 3,708,693

[45] Jan. 2, 1973

[54] GAMMA CORRECTOR

[75] Inventors: Hermann A. Ferrier, San Jose; Gordon F. MacGinitie, Menlo Park, both of Calif.

[73] Assignee: Ferrex Corporation, San Carlos, Calif.

[22] Filed: May 19, 1971

[21] Appl. No.: 144,782

[52] U.S. Cl. ..................307/229, 307/235, 328/142, 330/30

[51] Int. Cl. ..............................................G06g 7/12

[58] Field of Search ......307/229, 235; 328/143, 142; 330/30 D

[56] References Cited

UNITED STATES PATENTS

| | | | |
|---|---|---|---|
| 3,445,681 | 5/1969 | Cattermole et al. | 307/229 |
| 3,341,654 | 9/1967 | Pay et al. | 328/143 |
| 2,248,563 | 7/1941 | Wolff | 328/142 |
| 2,820,110 | 1/1958 | Valeton et al. | 328/143 |

*Primary Examiner*—James W. Lawrence
*Assistant Examiner*—Harold A. Dixon
*Attorney*—Julian Caplan and Gregg, Hendricson & Caplan

[57] ABSTRACT

A circuit for introducing a controlled nonlinearity in the video voltage applied to the cathode ray tube of a color film printing system for making the tube display picture the analog of the photographic paper. The characteristic curve of a cathode ray tube is matched to the reflectance curve of photographic paper by operating upon a video signal with a number of parallel amplifier stages with each stage comprising a pair of transistors having the emitters connected together and to a power supply by resistors of predetermined values. Each stage has a different characteristic and the outputs are summed to establish a predetermined nonlinear amplification.

4 Claims, 4 Drawing Figures

INVENTORS.
HERMAN A. FERRIER
GORDON F. MACGINITIE
BY Julian Caplan
ATTORNEY

INVENTORS.
HERMAN A. FERRIER
GORDON F. MACGINITIE
BY Julian Caplan
ATTORNEY

GAMMA CORRECTOR

BACKGROUND OF INVENTION

Various applications of electronics require signal amplification in a non-linear manner. Amplification or signal modification may be required in accordance with a variable function and this has led to the development of non-linear amplifiers and function generators.

One example of the foregoing is found in the field of color film processing by electronic systems. Inasmuch as this field is well known and has been treated in various publications and patents no detailed discussion thereof is included herein. It is, however, generally noted that sensitized paper employed for printing color film has some type of characteristic curve of reflection vs. exposure. In order to provide the display picture on a cathode ray tube in such a system, as an analog of the photographic paper, it is then necessary to insert a predetermined non-linearity in the video signal applied to the tube grid. This then provides for forcing the curve of the picture tube response to closely match that of the photographic paper.

The present invention provides a function generator introducing the desired non-linearity for an application such as that briefly noted above.

SUMMARY OF INVENTION

The present invention is described herein with respect to a color viewing system for the printing of color pictures purely as an example and without intent to limit the invention to such an application. The circuit of the present invention is comprised as a number of parallel connected amplifiers with each of such amplifiers comprising a pair of transistors. One transistor of each amplifier has the base thereof connected to a bias voltage supply. The collectors of each of these transistors are connected together to an output terminal. The bases of the other transistors of each amplifier are connected together and to an input terminal. Within each of the amplifiers a pair of resistors are provided for coupling the emitters of the transistors to a power supply.

The values of the coupling resistors in the amplifiers are predetermined so as to establish a desired transfer of conductivity between the two transistors of each amplifier at predetermined input signal levels and thus to establish different overall circuit amplification in different voltage ranges. In the application of the present invention noted above, the amplification in these voltage ranges and the voltage ranges themselves are tailored to conform to the characteristic reflection curve of photographic paper being employed in processing wherein the present invention is utilized.

DESCRIPTION OF FIGURES

The present invention is illustrated as to a single preferred embodiment thereof and one application in the accompanying drawings wherein.

DESCRIPTION OF PREFERRED EMBODIMENT

Figure 1:
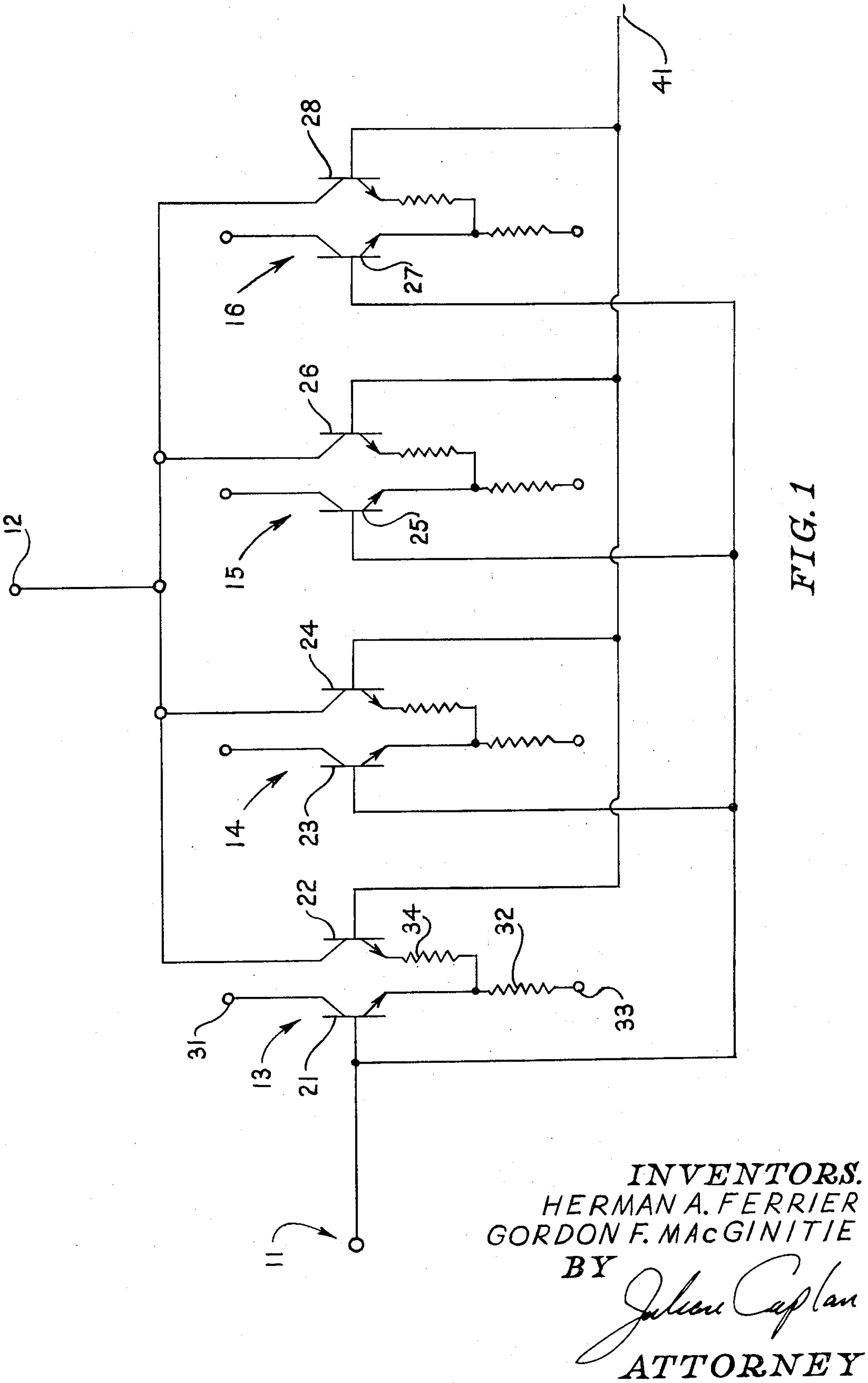
FIG. 1 is a circuit diagram of a function generator in accordance with the present invention.

Referring now to FIG. 1 there will be seen to be illustrated a circuit having an input terminal 11, output terminal 12 and four transistorized amplifier stages 13, 14, 15 and 16. Each of the amplifier stages comprises a pair of transistors so that there are included eight transistors 21 to 28.

Considering the first stage 13, it will be seen that the input terminal 11 is connected to the base of the first transistor 21. The collector of transistor 21 is connected to a positive power supply terminal 31 and the emitter of the transistor is connected through a resistor 32 to a negative power supply terminal 33. The emitter of the transistor 22 is connected through a resistor 34 to the emitter of the transistor 21 and will thus be seen to be connected to the negative power supply terminal 33 through the resistors 34 and 32. The collector of the second transistor 22 is connected to the output terminal 12.

Each of the other amplifier stages 14, 15 and 16 are formed in the same manner as stage 13 described above with the base of the first transistor of each stage connected to the input terminal 11 and the collector of the second transistor connected to the output terminal 12. Additionally the base of the second transistor 22 of stage 13 and likewise the base of the second transistor of each of the other stages are connected to a bias voltage terminal 41.

Considering further the first amplifier stage 13, it is noted that the values of the resistors 32 and 34 are predetermined to provide a particular operating characteristic for the stage. Considering operation of the circuit, it is noted that the bias voltage terminal 41 provides a negative bias voltage which is applied to the base of each of the transistors 22, 24, 26 and 28 so that substantially no current flows through these transistors when the base of each of the other transistors 21, 23, 25, and 27 are connected to ground at the input terminal 11. The circuit is adapted to receive negative going signals and as the input signal increases in a negative direction, each of the right hand transistors in the amplifier stages begins to conduct. The current conduction of each of the output transistors 22, 24, 26 and 28 is dependent upon the value of the emitter resistors thereof. The output current is a summation of the collector currents of the four output transistors with each of these transistors adding a different amount of current vs. voltage as established by separated emitter resistor values in the different amplifier stages.

As the input voltage continues to increase in the negative direction each of the stages adds an increasing current to the output signal current until the left hand transistor of the respective stage is cut-off. This cut-off of the input transistor of each stage occurs at the point when all of the current available from the power supply 33 of the first stage 13 for example, has been transferred to the output or right hand transistor of the stage.

Figures 2, 3, 4:
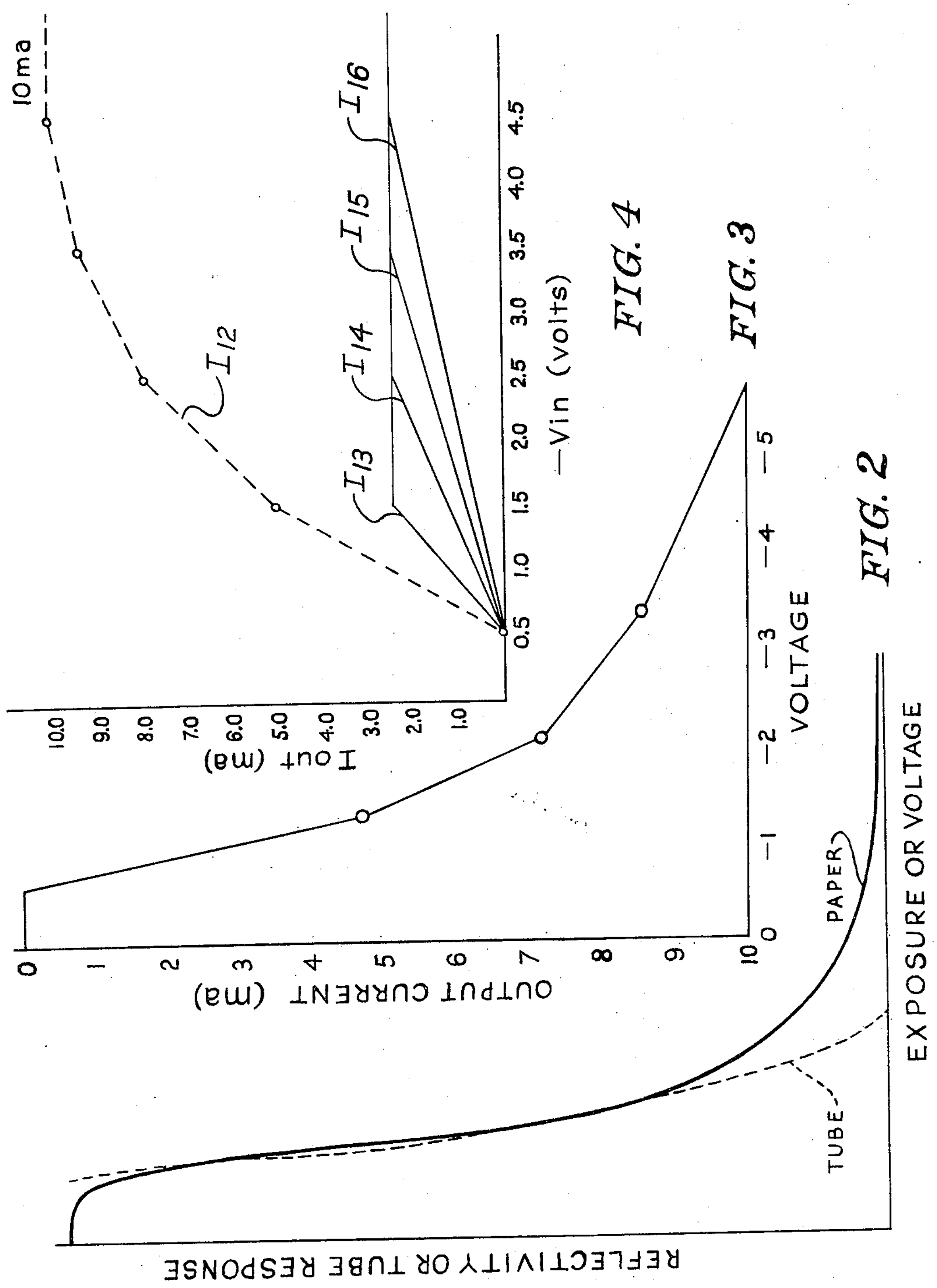
FIG. 2 is a characteristic reflectance curve of photographic paper as may be employed for printing color film and CRT characteristic curve.
FIG. 3 is a plot of output current vs. input voltage for the circuit of FIG. 1.
FIG. 4 is a plot of output current for each of the circuit of FIG. 1 and a summation of such currents.

Considering operation of the present invention somewhat further, reference is made to FIG. 2 of the drawings showing a characteristic reflection curve of one particular photographic paper as may be employed for the printing of color film. It will be noted that this reflection curve is not a straight line, i.e., the paper is more sensitive to light at the white end of the curve than at the black end. Consequently voltage signals representing light of different intensity require modification in accordance with the sensitivity of the paper in order that the end product i. e., printed film,shall in fact, truly represent the original picture. The colors of the picture are commonly displayed on a cathode ray tube and the electrical signals representing the color and color variations are applied to the grid of the tube so that an operator may visually determine the proper color for printing. The present invention may be employed to modify the response curve of the cathode ray tube as shown in FIG. 2 to conform it to the sensitivity curve of the photographic paper. In this respect reference is made to FIG. 3 illustrating output current v. input voltage of the circuit of FIG. 1 designed for this particular purpose.

As an example of operation of the circuit of FIG. 1 it may be considered that the bias voltage at terminal 41 is minus 0.5 volts, the amplifier power supply terminal 31 is +6 volts and terminal 33 is −15 volts, with similar voltages being applied to like terminals of the other amplifier stages. As noted above substantially no current flows to the output terminal 12 until the input voltage at terminal 11 decreases to more than −0.5 volts, i.e., the bias voltage applied at terminal 41. As the input voltage increases in the negative direction past −0.5 volts the right hand transistors of the amplifier stages commence conducting. Resistors 32 and 34 have predetermined values such that collector current of transistor 22 of this amplifier stage rises to a value of 2.5 milliamps at an input voltage of −1.5 volts. At this point all of the current from the power supply 33 is flowing through transistor 22 and consequently the input transistor 21 is cut-off so that the output current of this stage remains steady at 2.5 milliamps for a negatively increasing input voltage. The second stage 14 of the circuit has the values of the emitter resistors so chosen that the collector current of transistor 24 rises from 0 at a −0.5 input voltage to 2.5 milliamps at a −2.5 volt input. At this point the left hand transistor 23 is cut-off and the output current of this stage 14 remains constant at 2.5 milliamps for any negative input voltage in excess of −2.5 volts. The third stage amplifier 15 has the output current thereof rise from 0 to 2.5 milliamps for an input voltage variation of −0.5 volts to −3.5 volts. At this point the left hand transistor 25 is cut-off and the output current of transistor 26 remains constant at −2.5 milliamps. The final amplification stage 16 has the emitter resistors chosen such that the output current reaches 2.5 milliamps at a −4.5 volt input and remains constant for any larger negative input voltages.

The output currents of the separate amplification stages of the function generator are illustrated in FIG. 4 by the solid lines therein with the subscripts for the currents indicating the stages 13, 14, 15 and 16 of FIG. 1. FIG. 4 also illustrates a summation of the output currents by the dashed lines indicating the total output current $I_{12}$ appearing at the output terminal 12 of FIG. 1.

It will be seen that the output current vs. input voltage characteristic illustrated in FIG. 4 is in fact the same relationship as is illustrated in FIG. 3 but with a reversal of graphing conventions in FIG. 3 so as to illustrate the application of the curve to the tube characteristic of FIG. 2. The values of the emitter resistors of the separate stages of the function generator may be calculated by straightforward electronic theory to establish the desired different amplifications of the generator. For one particular application of the present invention illustrated in FIG. 3 the function generator provided a 0 amplification from 0 to −0.5 volts followed by a large amplification of the order of 5 milliamps per volt in the range −0.5 to −1.5 volts and successively decreasing amplifications in successive voltage ranges, as indicated.

The present invention will be seen to provide for establishing successive voltage ranges of different amplification with the extent of each voltage range and the amplification therein being determined by the value of emitter resistors in the successive stages of the generator hereof. It is not intended to indicate that the present invention is limited to the particular characteristic curve illustrated nor to any particular number of amplification stages. For some applications a lesser number of stages than illustrated may be sufficient and for more complicated applications additional numbers of stages may be required.

A similar function generator for positive input voltages and negative current could be built with PNP transistors.

What is claimed is:

1. A function generator for operating upon video voltage applied to the grid of a cathode ray tube in a color film printing system to match the tube characteristic to photographic paper characteristics comprising a plurality of amplifier stages with each stage including first and second transistors with a first resistor directly connecting transistor emitters and a second resistor directly connecting the emitter of a first transistor to a power supply, the values of the resistors being predetermined to transfer transistor conduction at a predetermined rate that is different for each stage, an input terminal connected to the first transistor of each stage, a bias voltage terminal connected to a second transistor of each stage, and an output terminal connected to the output of the second transistor of each stage whereby an input signal is amplified a different predetermined amount in different signal ranges.

2. The function generator of claim 1 further defined by the first and second resistors of each stage comprising a voltage divider coupling the emitter of the first transistor to said power supply terminal through a lesser resistance than the emitter of the second transistor, means maintaining said first transistor of each stage normally conducting in the absence of input signals, and the second transistor of each stage being biased to cut-off in the absence of input signals and over a predetermined value of input signals.

3. A function generator comprising a plurality of amplifier stages with each stage including a pair of NPN transistors with first and second series connected resistors directly connecting the emitter of a second transistor of the pair to a negative power supply terminal and directly connecting the emitter of a first transistor of the pair to the junction of first and second resistors, a bias power supply terminal connected to the base of the second transistor of each amplifier stage for establishing the voltage of which the stage is non-conducting, a positive power supply terminal connected to the collector of the first transistor of each amplifier stage for maintaining the first transistor initially conducting, means connecting the collector of the second transistor of each amplifier stage to an output terminal for summing the currents of said collectors as the generator output, and an input terminal coupled to the base of the first transistor of each stage.

4. The function generator of claim 3 further defined by the relative value of first and second resistors of each amplifier stage being such that the first transistor is cut off at a predetermined different value of voltage at said input terminal, whereby the amplification provided by the function generator is different in separated ranges of input voltage.

* * * * *